(12) United States Patent
Guo

(10) Patent No.: US 7,565,668 B2
(45) Date of Patent: Jul. 21, 2009

(54) OPTICAL DISC APPARATUS

(75) Inventor: Bin-Hai Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 404 days.

(21) Appl. No.: 11/303,270

(22) Filed: Dec. 16, 2005

(65) Prior Publication Data

US 2006/0136938 A1 Jun. 22, 2006

(30) Foreign Application Priority Data

Dec. 17, 2004 (CN) .................. 2004 2 01031121 U

(51) Int. Cl.
*G11B 33/12* (2006.01)
*G11B 33/14* (2006.01)
*G11B 25/04* (2006.01)

(52) U.S. Cl. .................. 720/652; 720/600; 720/648

(58) Field of Classification Search ......... 720/601–616, 720/600, 648, 652
See application file for complete search history.

(56) References Cited

U.S. PATENT DOCUMENTS

| 6,005,833 | A  | * | 12/1999 | Yasuma et al. .............. 720/602 |
| 6,567,360 | B1 | * | 5/2003  | Kagawa ..................... 720/609 |
| 2001/0048651 | A1 | * | 12/2001 | Nasu et al. ................. 369/77.2 |
| 2001/0048652 | A1 | * | 12/2001 | Kageyama et al. ......... 369/77.2 |

FOREIGN PATENT DOCUMENTS

CN 2418562 Y 2/2001

\* cited by examiner

*Primary Examiner*—William J Klimowicz
(74) *Attorney, Agent, or Firm*—Frank R. Niranjan

(57) ABSTRACT

An optical disc apparatus includes a cage, a frame, a main body, a circuit board, and an electrical connector. The frame is received in the cage and includes a first chamber and a second chamber. The first chamber and the second chamber are separated from each other. The main body is installed in the first chamber of the frame and is adapted for reproducing information from the optical disc. The circuit board is attached to the frame. The electrical connector is installed on the circuit board and is received in the second chamber of the frame. The electrical connector is capable of outputting reproduced information.

10 Claims, 5 Drawing Sheets

OPTICAL DISC APPARATUS

BACKGROUND

1. Field of the Invention

The present invention is generally related to an optical disc apparatus and, more particularly, to an optical disc apparatus used in a personal computer.

2. Related Art

Optical disc drive apparatuses have been widely used in audio and video equipment for reading and/or reproducing audio, video, documents, and the like, in a variety of media, such as CD (Compact Disc), DVD (Digital Versatile Disc), etc.

A conventional optical disc apparatus generally includes an optical pickup head and a circuit board. The optical head is used for reading information from an optical disc and transmitting electrical signals containing the information. The circuit board electrically connects with the optical head for receiving the electrical signals and reproducing information based on the received electrical signals.

Therefore, the pickup head generally includes a light source, an objective lens, and a photodetector. The light source emits a laser beam, and then the objective lens focuses the laser beam onto a recording layer of the optical disc. The focused laser beam is modulated by the information contained in the optical disc and reflected by the recording layer of the optical disc, so as to form a return beam. The return beam is converged by the objective lens and illuminates the photodetector. The photodetector generates electrical signals based on the return beam impinging thereon.

Hence, when a read-out surface of the optical disc and/or the objective lens is covered by dust, the laser beam may fail to be adequately focused on the recording layer of the optical disc. Furthermore, there are many chips on the circuit board. When the optical disc apparatus is in operation, these chips tend to produce a lot of heat. If these chips are covered by dust, the heat-sinking capability of the circuit board can be reduced. This reduced ability to remove such excess heat is liable to reduce the life of the optical disc apparatus.

Referring to FIG. 5, an optical disc apparatus 300 with a dustproof structure is illustrated. The optical disc apparatus 300 includes a base 301, a tray 302, a turntable 304, an optical pickup head (not shown), and a cover 312. The tray 304 is slidably engaged with the base 301 for loading and unloading an optical disc (not shown) onto or from the turntable 304. The turntable 304 is mounted on the base 301, for rotating the optical disc arranged thereon. The optical pickup head is slidably installed in the base 301, for reading information from the optical disc. The cover 312 is integrated with the base 301 and straddles the tray 302, thereby preventing the optical pickup head from being covered by dust or at least minimizing the opportunity for dust to collect thereon.

However, in the above-described optical disc apparatus 300, the cover 312 is located above the optical pickup head, the tray 301 and the optical disc, arranged on the turntable 304, so that a large space is located between the cover 312 and the optical pickup head. Therefore, dust also can cover the optical pickup head and other components, which are located below the cover 312, such as a circuit board.

Therefore, a heretofore unaddressed need exists in the industry to address aforementioned deficiencies and inadequacies related to the dust-proof structure.

SUMMARY OF THE INVENTION

One embodiment provides an optical disc apparatus. The optical disc apparatus includes a cage, a frame, a main body, a circuit board, and an electrical connector. The frame is received in the cage and includes a first chamber and a second chamber. The first chamber and the second chamber are separated from each other. The main body is installed in the first chamber of the frame and is configured for reproducing information from the optical disc. The circuit board is attached to the frame. The electrical connector is installed on the circuit board and is received in the second chamber of the frame. The electrical connector is configured for outputting reproduced information.

BRIEF DESCRIPTION OF THE DRAWINGS

Many aspects of the present optical disc apparatus can be better understood with reference to the following drawings. The components in the drawings are not necessarily to scale, the emphasis instead being placed upon clearly illustrating the principles of the present optical disc apparatus. Moreover, in the drawings, like reference numerals designate corresponding parts throughout the several views.

DETAILED DESCRIPTION OF PREFERRED EMBODIMENT

According to research, most optical disc apparatus have slots in their cages, with dust thus being capable of entering inside of the optical disc apparatus through these slots. Furthermore, these slots are not only located in front sides of the cages, but also located in rear sides thereof. Dust entering through the slots in the rear sides more easily falls on circuit boards of the optical disc apparatus than through the slots in the front sides. Therefore, it is very necessary to provide a dustproof mechanism in the rear sides of the cages of the optical disc apparatus.

Hereinafter, an embodiment of an optical disc apparatus 90 (shown in FIG. 1) according to the present apparatus will be described in detail with reference to the accompanying drawings.

Figure 1:
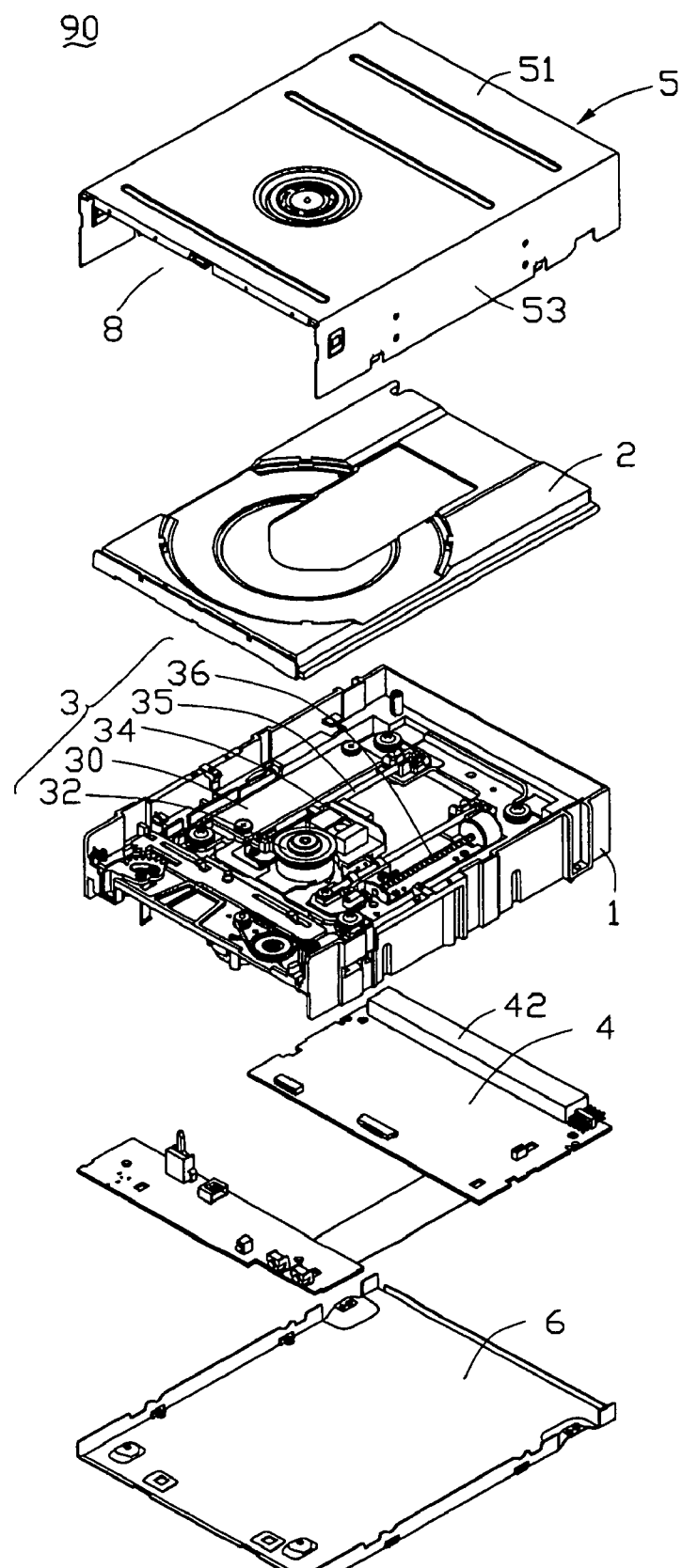
FIG. 1 is an exploded, isometric view of an optical disc apparatus according to a preferred embodiment of the present optical disc apparatus.
Figure 2:
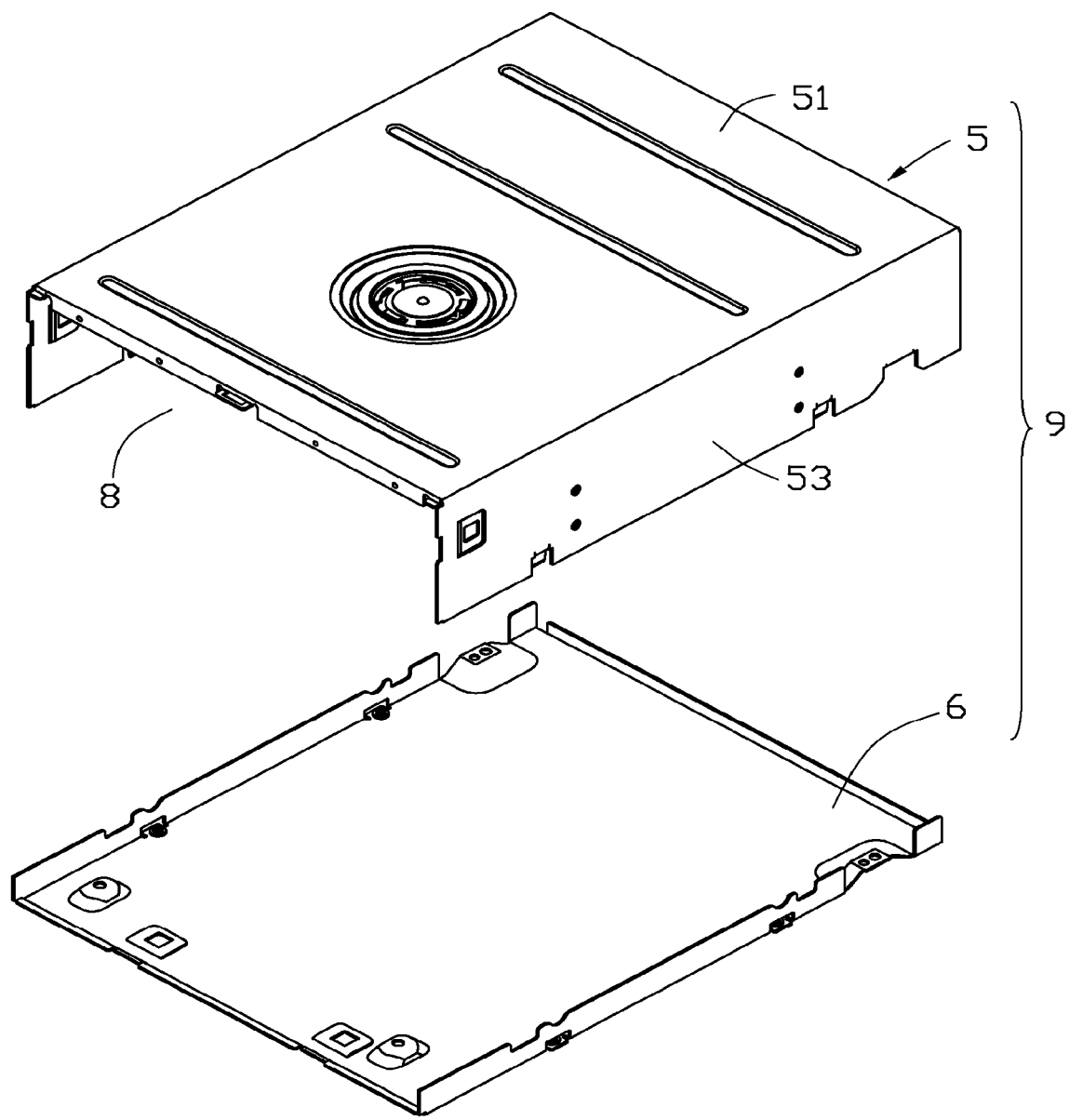
FIG. 2 is an exploded, isometric view of a cage of FIG. 1.
Figure 3:
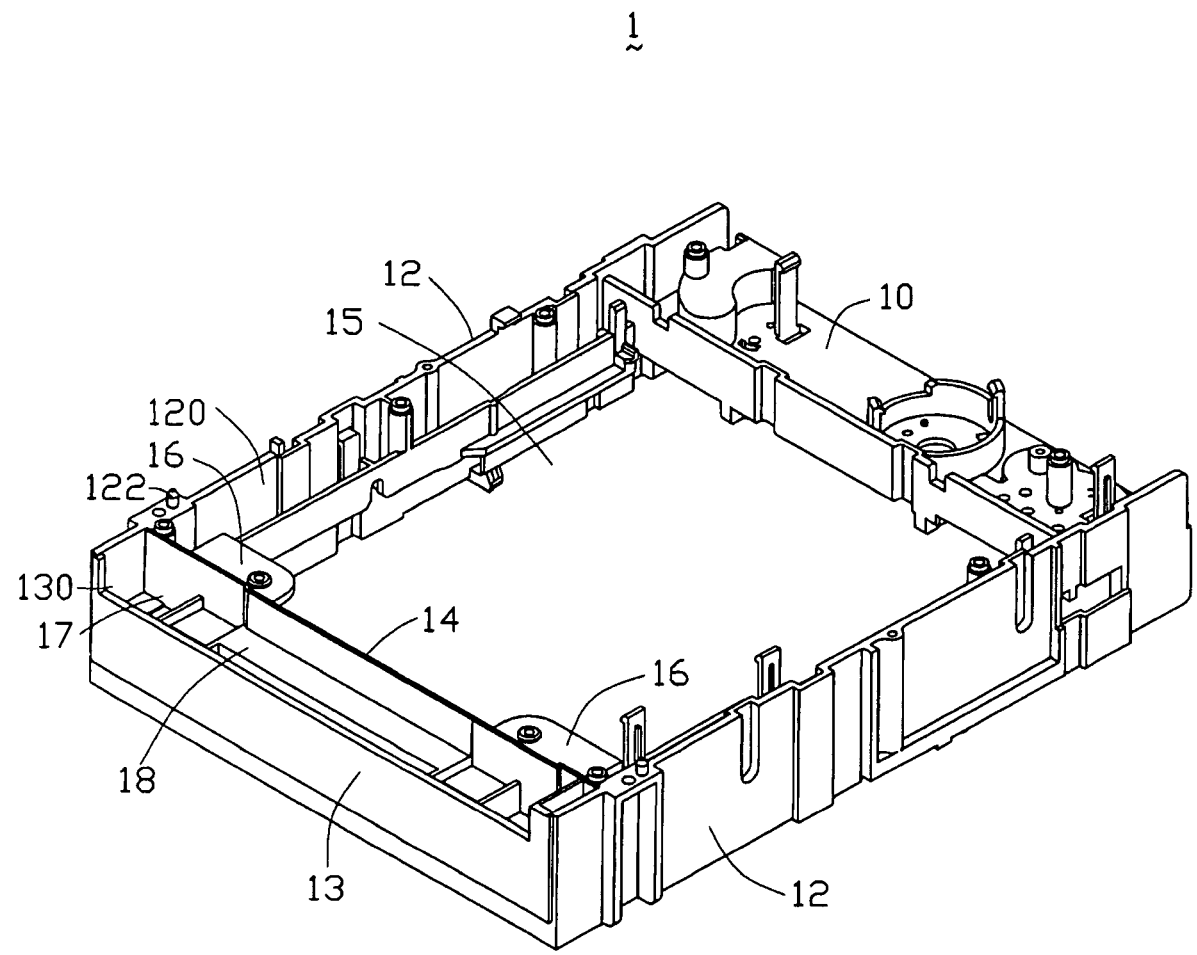
FIG. 3 is a rear, bottom, right-side isometric view of a frame of FIG. 1.
Figure 4:
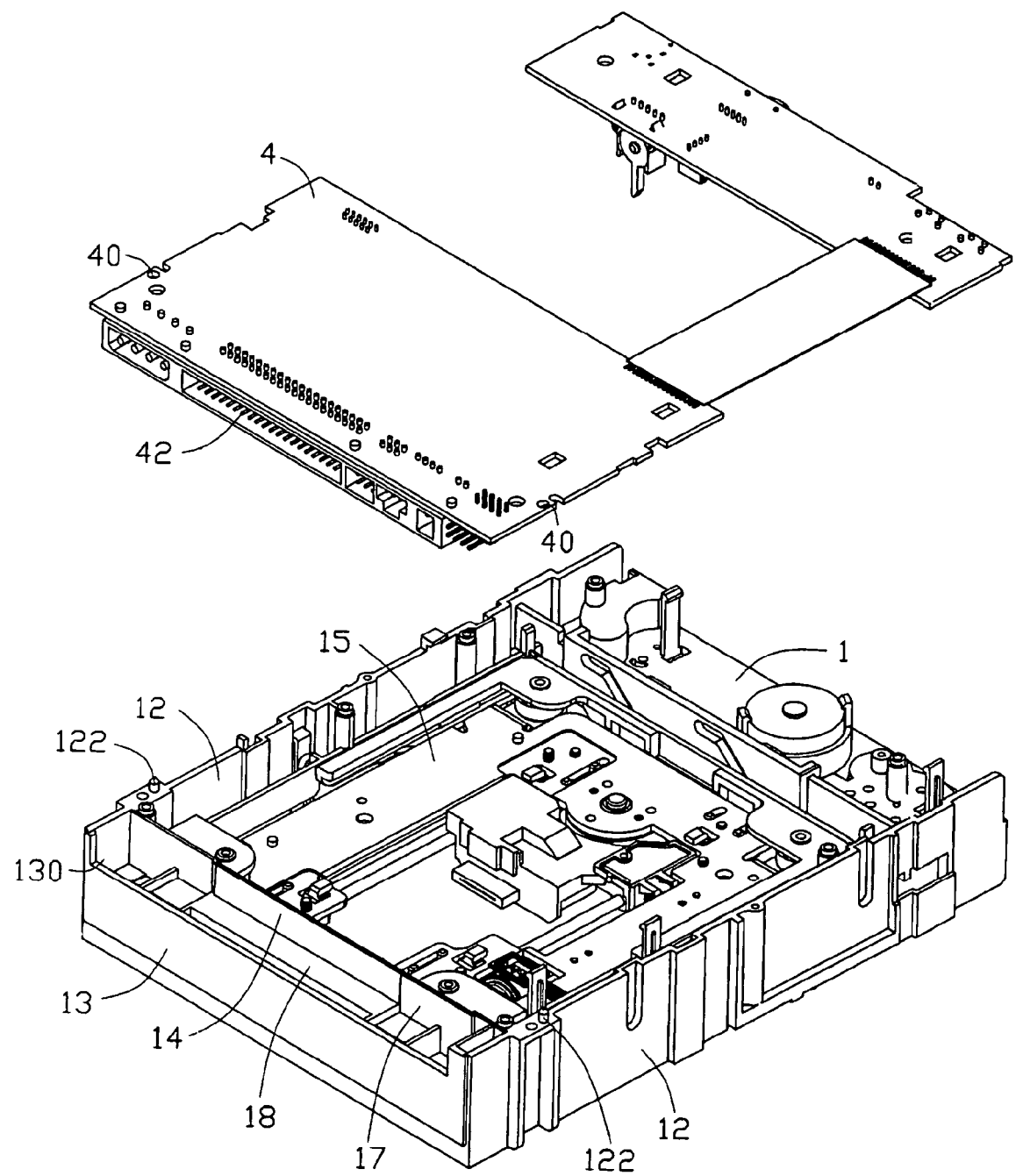
FIG. 4 is an exploded, enlarged, bottom isometric view of an assembly of the frame, a main body and a circuit board of FIG. 1.
Figure 5:
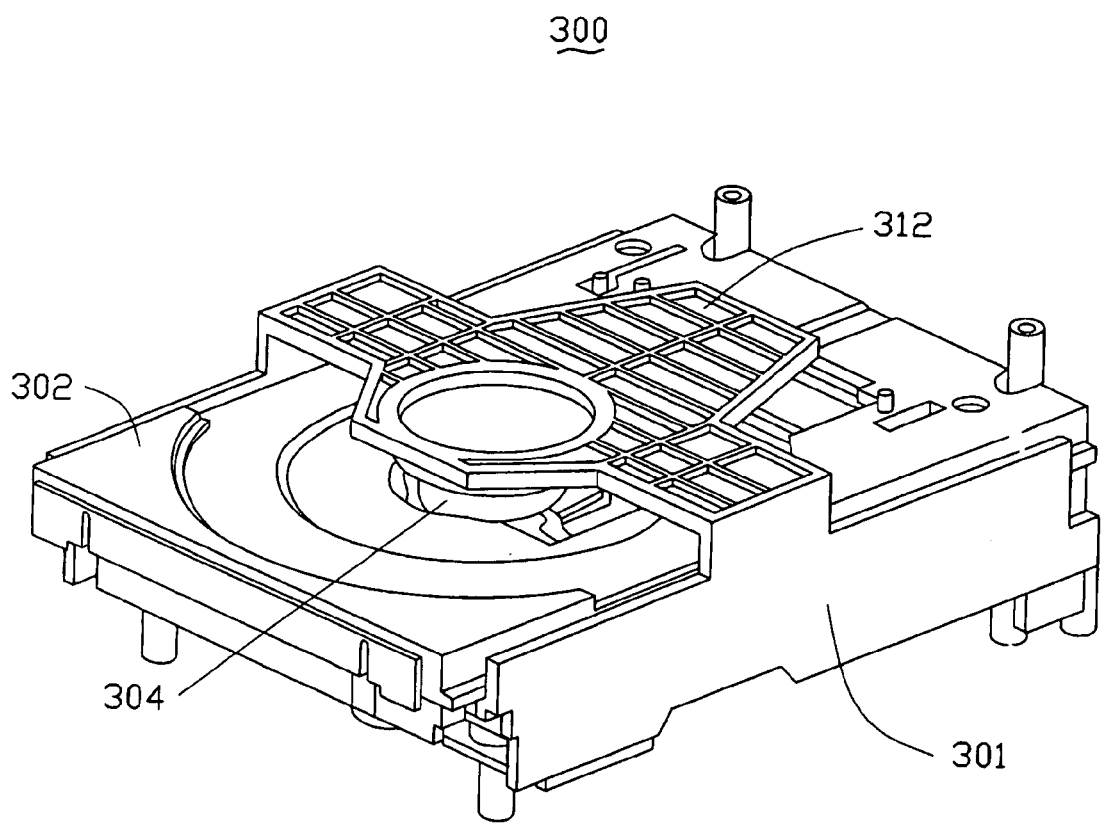
FIG. 5 is an isometric view of a conventional optical disc apparatus.

Referring to FIG. 1 and FIG. 2, the optical disc apparatus 90 including a cage 9, a frame 1, a tray 2, a main body 3, and a circuit board 4. The cage 9 includes an upper casing 5, a lower casing 6, and a front panel (not shown). The upper casing 5 has a top lid 51 and two sidewalls 53, vertically extending from opposite sides of the top lid 51. Two openings to which the lower casing 6 and the front panel attached are respectively defined at a lower face and a front face of the upper casing 5. Thus, an internal space 8 is defined by engagements of the upper casing 5, the lower casing 6, and the front panel. The frame 1, the tray 2, the main body 3, and the circuit board 4 are received in the internal space 8.

Referring to FIGS. 1 to 4, the frame 1 is integrally formed and includes a front bracket 10, a pair of sidewalls 12, a rear wall 13, a blocking wall 14, and a top wall 18. The pair of sidewalls 12 is parallel to each other, and the front bracket 10 and the rear wall 13 perpendicularly adjoin and link with the sidewalls 12 at opposite ends thereof. The blocking wall 14 parallels the rear wall 13 in an appropriate space and also interconnects with the opposite sidewalls 12. The top wall 18 is perpendicularly fastened to the rear wall 13 and the blocking wall 14 and with the pair of sidewalls 12. As a result, a first receiving chamber 15 is defined by surrounding of the front bracket 10, the pair of sidewalls 12, and the blocking wall 14, and a second receiving chamber 17 is defined by surrounding of the pair of sidewalls 12, the rear wall 13 and the blocking wall 14. The second receiving chamber 17 is covered by the top wall 18.

A pair of supporting plates 16 horizontally extends from internal surfaces 120 of the sidewalls 12 into the first receiving chamber 15. Such supporting plates 16 are configured for supporting the main body in the first receiving chamber 15. A recess 130 is defined at a lower side of the rear wall 13 and communicates with the second receiving chamber 17. This recess 130 is adapted for revealing a portion of a component that is received in the receiving chamber 17.

The tray 2 is configured to slidably engage with the frame 1, in order to facilitate loading and unloading of an optical disc onto or from the main body 3. The main body 3 includes a base plate 30, a turntable 32, an optical pickup head 34, and a power transmission mechanism 36. The turntable 32 is mounted on the base plate 30, and the optical disc, loaded via the tray 2, is arranged on the turntable 32 to allow selective rotation thereof. The optical pickup head 34 is sleeved on a pair of guide shafts 35. As such, the optical pickup head 34 is supported on the base plate 30 and is movable in a radial direction of the optical disc located on the turntable 32. The power transmission mechanism 36 is also mounted on the base plate 30 and parallels the pair of guide shafts 35. The power transmission mechanism 36 is thereby designed and arranged for applying a driving force to the optical pickup head 34.

The circuit board 4 electrically connects with the turntable 32 and the power transmission mechanism 36, respectively, for applying voltages to them. Further, the circuit board 4 is operatively linked with the optical pickup head 34 and is thus configured for receiving electrical signals produced by the optical pickup head 34. A pair of mounting holes is defined in opposite sides of the circuit board 4. An electrical connector 42 is fastened on a rear side of the circuit board 4. This electrical connector 42 is adapted for inputting power and outputting reproduced signals out of the optical disc apparatus 90.

In assembly, the main body 3 is installed in the first receiving chamber 15 of the frame 1. A rear side of the base plate 30 is fastened on the supporting plates 16 of the frame, via, e.g., screws, other fasteners, or welds (not shown). A front side of the base plate 30 is liftably attached to the front bracket 10. Thus, the main body 3 is assembled with the frame 1. Then, the tray 2 is horizontally slid into the frame 2. The circuit board 4 is attached to the bottom of the frame 1, via, e.g., screws or other mechanical or metallurgical means (not shown) and covers the bottoms of the first and second receiving chambers 15, 17. The pins 122 of the frame 1 are inserted into the mounting holes 40 of the circuit board 4. The electrical connector 42 is received in the second receiving chamber 17 of the frame 1 and the recess 130. Finally, the frame 1, the tray 2, the main body 3, and the circuit board 4 together constitute a subassembly, and this subassembly is covered by the upper casing 5, the lower casing 6, and the front panel.

In above-mentioned optical disc apparatus 90, the main body 3 is received in the first receiving chamber 15, and the electrical connector 42 is received in the second receiving chamber 17. The front of the electrical connector 42 faces the blocking wall 14 of the frame 1, and the top of the electrical connector 42 faces the top wall 18 of the frame 1. Therefore, the duct entering through the rear side of the optical disc apparatus 90 is stopped in the second receiving chamber 17 by the blocking wall 14.

It should be emphasized that the above-described embodiment of the present invention is merely one possible example of its implementation and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. An optical disc apparatus comprising:
   a cage;
   a frame received in the cage and defining a first chamber and a second chamber, the first chamber and the second chamber being separated from each other, the frame further comprising a pair of sidewalls and a blocking wall interconnecting with the pair of sidewalls, the blocking wall having a substantially flat top surface for separating the second chamber from the first chamber;
   a main body installed in the first chamber of the frame, the main body being configured for reproducing information from an optical disc;
   a circuit board attached to the frame; and
   an electrical connector installed on the circuit board and received in the second chamber of the frame, the electrical connector being configured for outputting reproduced information;
   wherein the frame comprises a pair of supporting plates extending horizontally from corresponding internal surfaces of the pair of sidewalls and internal surface of the blocking wall into the first chamber, the pair of supporting plates are configured for supporting the main body in the first chamber.

2. The optical disc apparatus according to the claim 1, wherein the frame further includes a front bracket, and a rear wall, the front bracket connects to the pair of sidewalls for defining the first chamber, the rear wall connects to the pair of sidewalls for defining the second chamber.

3. The optical disc apparatus according to the claim 2, wherein the blocking wall is substantially perpendicular to the pair of sidewalls.

4. The optical disc apparatus according to the claim 2, wherein the blocking wall faces the electrical connector.

5. The optical disc apparatus according to the claim 2, wherein the frame further includes a top cover, the top cover covering the second chamber.

6. The optical disc apparatus according to the claim 5, wherein the top cover joins the pair of sidewalls.

7. The optical disc apparatus according to the claim 2, wherein the rear wall defines a recess communicating with the second chamber.

8. The optical disc apparatus according to the claim 1, wherein the circuit board covers a bottom of the second chamber.

9. The optical disc apparatus according to the claim 1, wherein the frame is integrally formed.

10. An optical disc apparatus comprising:

a cage;

a frame received in the cage, the frame comprising a front bracket, a pair of sidewalls, a blocking wall, and a rear wall, the front bracket and the blocking wall interconnecting with the pair of sidewalls for defining a first chamber, the rear wall and the blocking wall interconnecting with the pair of sidewalls for defining a second chamber, the blocking wall completely separating the second chamber from the first chamber;

a main body installed in the first chamber of the frame, the main body being configured for reproducing information from an optical disc;

a circuit board attached to the frame;

an electrical connector installed on the circuit board and received in the second chamber of the frame, the electrical connector being configured for outputting reproduced information; and a pair of supporting plates, the pair of supporting plates extending horizontally from corresponding internal surfaces of the pair of sidewalls and internal surface of the blocking wall into the first chamber, the pair of supporting plates are configured for supporting the main body in the first chamber.

* * * * *